Aug. 18, 1931.   C. A. DE GIERS   1,818,972
LIQUID LEVEL INDICATOR
Original Filed May 9, 1922   2 Sheets-Sheet 1
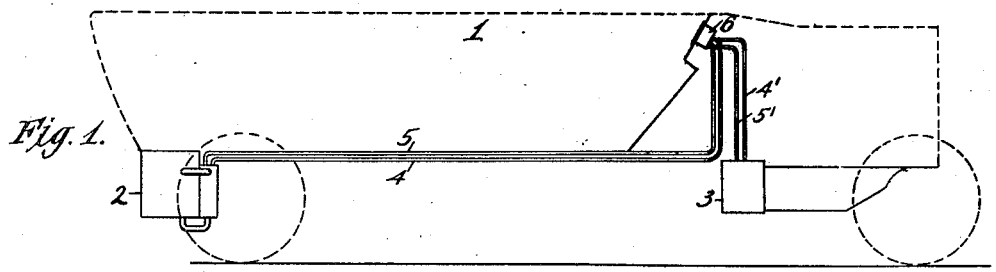
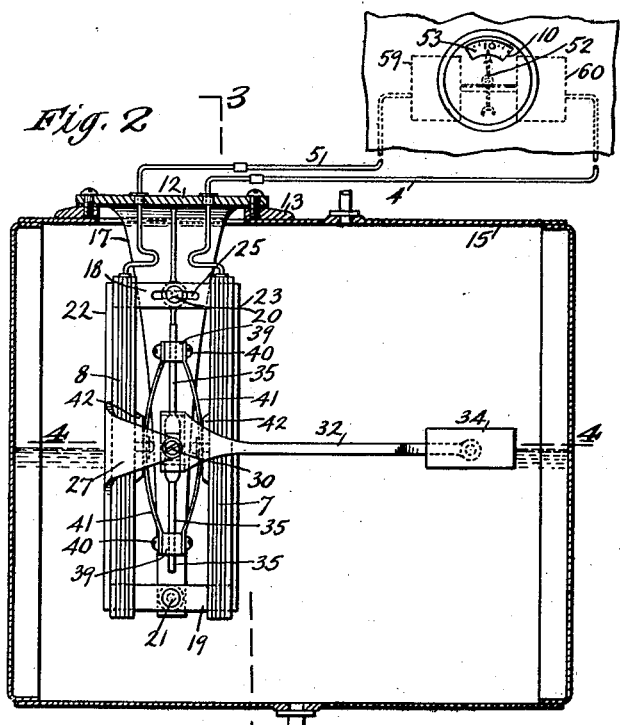
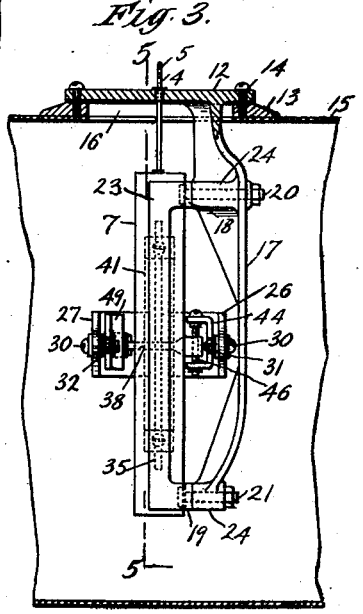
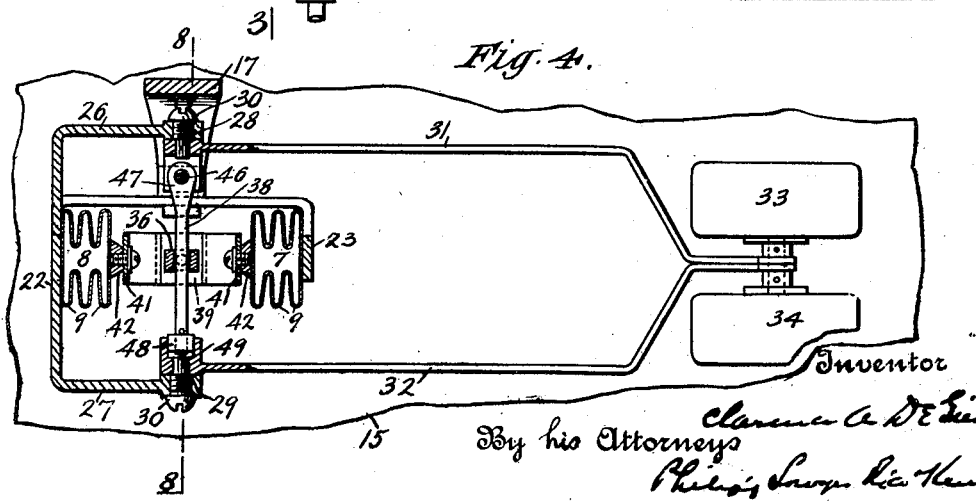

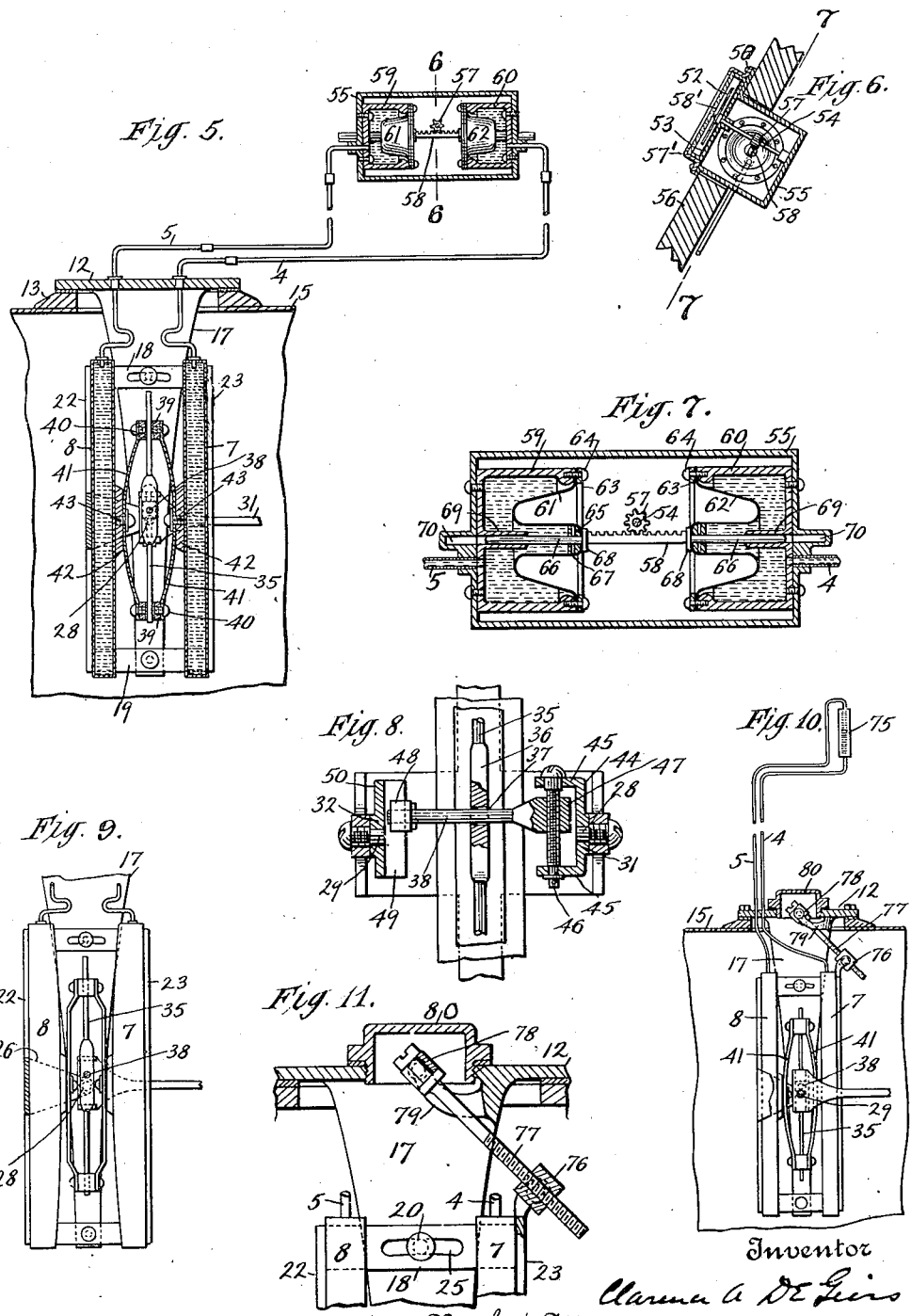

Patented Aug. 18, 1931

1,818,972

UNITED STATES PATENT OFFICE

CLARENCE A. DE GIERS, OF NEW YORK, N. Y., ASSIGNOR BY MESNE ASSIGNMENTS, TO THE LIQUIDOMETER CORPORATION, OF WILMINGTON, DELAWARE, A CORPORATION OF DELAWARE

LIQUID LEVEL INDICATOR

Application filed May 9, 1922, Serial No. 559,669. Renewed May 28, 1930.

This invention relates to certain improvements in liquid level indicators or gauges of the general type disclosed in my co-pending applications, Serial Nos. 447,640, filed February 25, 1921 and 500,585, filed September 14, 1921.

It is the especial object of the present invention to produce a liquid level indicator or gauge embodying the broad principles of the devices as shown in my prior applications, but in which the mechanism has been somewhat changed and rearranged and simplified, so as to produce an indicator mechanism which may be more cheaply constructed than the mechanisms shown in my prior applications and which may be used in automobiles, for instance, of a cheaper type than those for which my prior mechanisms were designed, it being a further object of the invention to so arrange the tank part of the indicating mechanism that it may be readily installed in an automobile without necessitating changes or modifications in the tank structure, or work inside the tank for securing the mechanism in position.

With these and other objects not specifically referred to, the invention consists in certain novel parts, arrangements and combinations, a detailed description of which will be given in connection with the accompanying drawings and the novel features then pointed out more specifically in the claims hereunto annexed.

Referring now to these drawings—

Figure 1 is a diagrammatic side elevation of the arrangement of the indicator mechanism when employed with an automobile and where an indicator mechanism is provided for both the gasoline and oil tanks of the car, the outline of the machine being shown in dotted lines.

Figure 2 is a vertical section, partly broken away, showing the improved actuating mechanism for the indicator, the indicator shown in this figure being of the dial type.

Figure 3 is an end sectional view, the view being taken on the line 3—3 of Fig. 2.

Figure 4 is a sectional plan view of the mechanism illustrated in Figs. 2 and 3, the view being taken on line 4—4 of Fig. 2.

Figure 5 is a vertical section taken on line 5—5 of Fig. 3, with the addition of the mechanism for operating the dial indicator, this latter mechanism being shown in section.

Figure 6 is a detail sectional view, the section being taken on line 6—6 of Fig. 5, showing part of the indicating mechanism attached to the dashboard of an automobile.

Figure 7 is an enlarged longitudinal sectional view of the dial operating mechanism, the section being taken on line 7—7 of Fig. 6.

Figure 8 is a detail sectional view of the float adjusting mechanism, the section being taken on line 8—8 of Fig. 4.

Figure 9 is a side view partly broken away and partly in section of certain of the parts shown in Fig. 5, the expansion chambers being shown in the position they occupy when affected by heat expansion in the chambers.

Figure 10 is a side view partly broken away and partly in section showing the method of connecting the expansion chambers where the device is used with a liquid indicator; and Figure 11 is a detail sectional view, on an enlarged scale, showing an adjusting mechanism for adjusting the liquid level in a liquid indicator where a liquid is employed.

Referring now, generally, to the structure shown in these drawings, the indicator employed may be either of the dial type, or of the type in which the indicating is effected by two different colored liquids in a glass gauge. In accordance with the object of the invention the improved mechanism by which these indicators, whichever type may be employed, are actuated, is designed so that the mechanism may be assembled and then dropped into the gasoline or oil tank of an automobile or other tank in which the invention may be used, through a suitable opening in the top of the tank. With this construction, no soldering or other work inside the tank is necessary, the parts being supported from the top surface of the tank; thus the mechanism can be readily and quickly installed without necessitating a re-designing of the tank or any interior work therein.

The invention will also, generally speaking, include improved means for preventing any expansion or contraction in the parts due to changes in temperature from affecting the indicator, so that the indicator will always truly indicate the liquid level in the tank, irrespective of heat and cold conditions.

Referring now specifically to the drawings, the invention is designed particularly for use with automobiles, airplanes and the like where an accurate indication of gasoline or oil, carried by the machines, is required, and the invention has been illustrated as employed with an automobile. Where thus employed, there will preferably be a mechanism for indicating the gasoline and one for indicating the oil, these two mechanisms leading to suitable indicators which are placed on the dashboard of the machine, and this construction has been illustrated in Figure 1, in which the automobile is indicated by the numeral 1, the gasoline tank by the numeral 2 and oil tank by the numeral 3. Pipe connections 4, 5 are shown leading from the gasoline tank to a block 6, in which the indicators are mounted and pipes 4', 5' are shown leading from the oil tank 3 to the block 6, these pipes connecting with the mechanisms by which the indicators are actuated.

In accordance with the invention, the mechanism for operating the indicators is proportioned and arranged so that it may be operatively positioned without necessitating any structural changes in the tank with which it is to be used, and where the mechanism is positioned in the tank, so that it may be positioned without necessitating any interior work for securing it in place. This operating mechanism will, like that of my applications above referred to, be actuated by the level of the liquid in the tank and as these operating mechanisms are identical, but one will be described. Each of these operating mechanisms is, as shown, preferably located in the tank, and will include a closed circuit comprising a pair of expansion and compression chambers containing a liquid and piping leading to each side of the indicator or gauge. These expansion chambers are indicated by the numerals 7, 8, and are preferably made of a resilient metal, such as thin copper, which will compress and expand in but one direction, the walls of the chambers being bent or corrugated as indicated at 9 and forming in effect a bellows which will contract and expand sideways. These chambers are, in the present embodiment of the invention, supported so as to lie close together and are formed so as to be of comparatively narrow width so that they and their supporting means may be lowered into the tank through an opening of suitable size provided in the tank top.

These chambers are filled with a liquid such as oil or the like. In the construction illustrated in the drawings, the mechanism shown is that for indicating the liquid level in the gasoline tank. The chambers 7, 8, therefore, have extended from the upper ends thereof, the pipes 4, 5 which lead to the opposite sides of the indicator, which, in the construction illustrated in Figs. 2 to 9, inclusive, is a dial indicator indicated generally by the numeral 10, this dial and the mechanism for operating it through the medium of the liquid in the pipes 4, 5 being more specifically referred to hereinafter.

The means for supporting and connecting the expansion chambers 7, 8 so that they may have opposite reciprocating expanding and contracting movements and the means whereby temperature changes in the mechanism are compensated for, may be varied and will be varied, depending on the character of the indicator employed. Referring, first, to the construction shown in Figures 2 to 9, inclusive, in which a dial indicator is employed, the means for compensating for temperature changes will be located in the mechanism whereby the dial is operated through the liquid pressure from the chambers.

In the particular construction illustrated, for supporting the chambers 7, 8, there is provided a plate 12 secured to a flange 13 by means of set screws 14. This flange 13 is welded or otherwise permanently secured to the top of the tank, indicated at 15, and surrounds an opening 16, this opening being dimensioned sufficiently to permit the chambers and their support to be inserted therethrough into the tank. The chambers are supported from this plate 12 so as to derive their whole support therefrom, thus rendering it unnecessary to do any work inside the tank. This is effected by a bracket 17, which may be cast integral with the plate 12. This bracket has secured thereto upper and lower cross bars 18, 19 to which are secured side plates 22 and 23, bolts 20, 21 being employed to secure the cross bars to the bracket, the bolts passing through the cross bars and securing the parts against hubs 24 formed on the bracket 17. The lower bolt 21 acts as a pivot on which the lower cross bar 19 may rock and the upper cross bar 18 is, for purposes hereinafter referred to, provided with a slot 25 in which may work the inner end of the bolt 20.

Expansion chamber 7 is secured to side plate 23 as by welding it thereto, and expansion chamber 8 is similarly secured to side plate 22. At a point intermediate the upper and lower cross bars, one of the side plates, as side plate 22, is provided with a pair of inturned wings 26 and 27 spaced apart, these wings being provided with thickened ends to form a support for pivots 28 and 29, these pivots being in the form of screws 30.

Secured on these pivots are a pair of spaced arms 31 and 32, which, at their other ends, may be joined together and support a float in the form of a pair of metal chambers 33 and 34. It will, of course, be understood that any other suitable float may be employed, if desired.

The expansion chambers 7, 8 are connected so as to be given opposite reciprocating movements by the movement of the float so that as the float rises and falls in the tank, due to change in the liquid level therein, these chambers will be moved so as to cause the liquid therein to be compressed in one chamber and expanded in the other, this movement of the liquid actuating the dial-operating mechanism hereinafter referred to. While the particular means for effecting this may be somewhat varied in construction, in the particular construction illustrated there is provided an actuator rod 35 having a thickened central portion 36 which is apertured, as at 37, (Fig. 8) through which is passed a short rod 38 which, as will hereinafter appear, is connected to the float arms and is actuated thereby. The rod 35 passes through a pair of blocks 39, to each of which is secured at each side by means of screws 40, a pair of plates 41. These plates are, in turn, secured to the opposite inner sides of the expansion chambers 7 and 8 in any suitable manner. In the particular construction illustrated, see Fig. 5, there is provided a pair of blocks 42, welded or otherwise firmly secured to the walls of the chambers and the plates 41 are secured to these blocks by means of screws 43.

As the float rises and falls, the rod 38 bodily moves the rod 35 and through the plates 41 causes a reciprocating movement of the chambers, compressing one chamber and expanding the other chamber, this movement of the chambers effecting a movement in the dial-operating mechanism hereinafter referred to and causing the dial to indicate a change in the level of the liquid in the tank.

In the best constructions means will be provided for adjusting the throw of the rod 35 so as to compensate for slight differences in the position of the parts in the tank and for tanks of different depths, and so that more or less of a reciprocating movement may be given the expansion chambers. While various means may be employed for this purpose, in the best constructions, these means will be such that they can be reached through the opening 16, before referred to, and as illustrated, these means comprise arrangements whereby the actuator 38 may be moved toward or away from the axis of the pivots 28, 29, to which the float arms are secured so as to increase or decrease the arc through which the rod 38 moves the rod 35. The specific means for effecting this may be somewhat varied but in the particular construction illustrated, the end of float arm 31 is widened, as indicated at 44 in Fig. 8, and this widened portion is turned in to form a yoke 45 in which is positioned an adjusting screw 46, this adjusting screw passing through a threaded opening in an enlargement 47, formed at one end of the rod 38, before referred to. By adjusting this screw, the rod 38 may be moved to and from the axis of the pivot points of the float arms moving with it the rod 35, this rod 35 having a sliding movement in the blocks 39, before referred to, so that it can partake of this rising and lowering movement imparted to it by the rod 38. To permit the rod 38 to be evenly lowered, this rod is, at its opposite end, provided with a block 48 which slides in a guideway 49, see Figs. 4 and 8, formed in an extension 50 at the end of float arm 32.

With this construction, the actuating rod 35 may be adjusted to give any desired or required compressing or expanding movement to the chambers 7, 8 and this adjustment may be effected through the opening 16 in the tank, before referred to, by means of any suitable tool, such as an ordinary screw driver.

The chambers are connected by piping to opposite sides of the indicator, which as before stated, is preferably located, when used with an automobile, on the dash, so as to be readily visible to the operator of the car. As before stated, this indicator may be of various constructions. In the mechanism shown in Figs. 2 to 9 inclusive, this indicator is a dial indicator employing a rocking needle 52 and a stationary dial 53, this dial bearing suitable indicia for indicating the amount of liquid carried in the tank.

This needle is oscillated by the action of the compressing and expanding movement of the expansion chambers through mechanism which will now be described in detail.

In the best constructions and where a dial indicator is employed, the mechanism for actuating the needle will include means whereby a variance of temperature in the system may be compensated for so that a change in the temperature in the system will not effect the needle. In the particular construction illustrated, this needle is carried on a shaft 54 which takes bearing in the sides of a casing 55 secured to a dashboard 56. The needle shaft carries a pinion 57 which meshes with a rack 58 by the movement of which rack the needle shaft is oscillated. The dial 53, which may be of a sheet of paper or any suitable material, carrying the desired indicia, may be clamped against a front wall of the casing 55, which extends through the dash and is secured thereto as by clamps 86, and the dial and needle may be protected by a cap 57' having a viewing glass 58'. If it is necessary to change the position of the dial relatively to the needle, this cap may be removed and the dial turned to the desired position to agree with the needle for any given level in the tank.

The operating mechanism for actuating the rack includes a pair of chambers 59, 60, which are secured to the center walls of the casing 55. These chambers are in connection with the expansion chambers through the pipes 4, 5, pipe 4 leading from expansion chamber 7 to chamber 60 and the pipe 5 leading from expansion chamber 8 to the chamber 59, the expansion chambers, pipes and chambers 59, 60 being filled with a suitable liquid, such as light oil. The front walls of these chambers are formed of flexible diaphragms, such as rubber or other suitable material, in the form of cups, 61, 62, the edges of these cups being held to the front walls of the chambers by retaining rings 63 and screws 64. The center portions of these cups are connected to the rack 58 so that as the cups move in and out, due to the increase of fluid pressure in the chambers, the rack will be moved and the pinion 57 rotated, thus causing the oscillation of the needle. While this may be effected in various ways, in the particular construction illustrated, the center portion of each rubber cup is stretched over a block 65, which is pinned to an extension 66 on the rack by means of pins 67 and to assist in the movement, there are preferably provided collars 68 on the rod which bear against the block 65. To retain the parts in position, the rods 66 extend into guideways 69 formed in the chamber walls and extending into sockets 70 formed in the outer walls of the casing, before referred to. With this construction, the pressure of fluid transmitted to the cups by the expansion and contraction chambers 7 and 8, will cause movement of diaphragms and this movement will actuate the rack and pinion to oscillate the needle. If there be a slight increase of pressure in the system, due to expansion or contraction of the parts by reason of changes in temperature, the rubber diaphragms will yield to accommodate this slight increase without operating the needle so that the position of the needle is changed only by a change in the level of the liquid in the tank.

Under some circumstances, it may be desirable to use the type of expansion chambers and the means for mounting them shown in the present application with an indicator such as shown in my applications before referred to, in which differently colored immiscible liquids are employed showing in a sight indicator to indicate the difference in tank level, and a construction is shown in Figs. 9 and 10 whereby this may be effected. Where differently colored liquids are employed, a portion at least of the circuit on each side of the indicator gauge marked 75, is filled with different colored liquids, though of course, if desired, each one of the chambers and the piping leading therethrough may be filled with such differently colored liquids. Where this system is employed other means than those herein described, for taking care of difference in temperature, are provided and there has been shown a simple means for effecting this in the present case. Referring to Fig. 10, the plates 41 are spring plates, that is, these plates have a certain amount of resiliency so that as the chambers 7, 8 expand or contract due to temperature changes, as indicated in Fig. 9, these plates will have a slight sliding movement on the rod 35 to permit of this expansion and contraction, due to such temperature changes, the plates being connected to the blocks 39 and thus connecting the chambers 7, 8 together, as one chamber is expanded or contracted the other expands and contracts equally and the dial is not affected.

Where the liquid indicating system is employed, furthermore, an adjustment is preferably provided so that the level in the gauge 75 may be adjusted to set at a desired point corresponding to the amount of liquid in the tank and preferably this adjusting mechanism will be such that it can be reached through the opening 16, before referred to. In the particular construction illustrated, one of the expansion chambers, as 7, has secured thereto a screw block 76 in which takes the threaded end of an adjusting screw 77, the other end of the adjusting screw passing through a thrust collar or nut 78 on an extension 79 from the bracket 17, before referred to, and the end of this adjusting screw is reached through a cap 80 secured on the plate 12 before referred to.

While the invention as above shown and described is in its preferred form, it will be understood that certain changes and variations may be made in the specific constructions shown and described and the invention is not to be limited to these.

What I claim is:

1. In a device of the character described, the combination of a tank, a float in the tank, a pair of compressible and expansible fluid containing chambers, an actuating rod, connections between the rod and the chambers in which connections the rod has a sliding movement, an arm pivotally mounted at one of its ends, means connecting said arm at its pivoted end to the rod and means connecting said arm at its other end to the float whereby said rod is adapted to be moved sidewise by the float to compress one chamber and expand the other as the float rises and falls, a pressure responsive indicating device and pipe means interconnecting said device and said chambers whereby said device is adapted to function through the difference in fluid pressure in the chambers for indicating the position of said float in the tank.

2. In a device of the character described, the combination of a tank, a float in the tank, a pair of compressible and expansible fluid containing chambers, a laterally reciprocable actuator rod, connections between the rod and the chambers permitting the reciprocable movement of the rod to compress one chamber and expand the other as the float rises and falls, connections between the rod and the float including means for adjusting the extent of the reciprocable movement of the rod, a pressure responsive indicating device, and means to cause said device to function through the difference in the fluid pressure in the chambers for indicating the amount of liquid in the tank.

3. In a device of the character described, the combination of a tank, a float in the tank, a pair of compressible and expansible fluid containing chambers, a plate secured to each chamber, clamping means to connect the plates to each other, an actuator rod to which the plates are operatively connected through said clamping means so as to be movable relatively to said rod, a pivotally mounted float arm, means connecting the arm to the actuator rod, a pressure responsive indicator, and pipe connections from the chambers to the indicator through which the movement of fluid in the chambers actuates the indicator.

4. In a device of the character described, the combination of a tank, a float in the tank, pivoted float arms, a pair of fluid containing compressible and expansible chambers, a laterally reciprocable actuator rod, a second rod on which the reciprocable rod is pivoted, connections from the second rod to the float arms including an adjusting screw by means of which said second rod may be adjusted relatively to the pivot of the float arms, connections from the actuator rod to the chambers, a pressure responsive indicator, and fluid transmitting connections from the chambers to the indicator.

In testimony whereof, I have hereunto set my hand.

CLARENCE A. DE GIERS.